US012632247B2

(12) United States Patent
Chen et al.

(10) Patent No.: US 12,632,247 B2
(45) Date of Patent: May 19, 2026

(54) AUTOMATIC REDEPLOYING/UPGRADING OF CONTAINERS ON MULTIPLE NODES IN AN INFORMATION TECHNOLOGY INFRASTRUCTURE BASED ON UNAVAILABLE PATCHES

(71) Applicant: International Business Machines Corporation, Armonk, NY (US)

(72) Inventors: Xiao Ling Chen, Beijing (CN); Juliet Candee, Brewster, NY (US); Heng Wang, Beijing (CN); Qi Ye, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 18/672,100

(22) Filed: May 23, 2024

(65) Prior Publication Data

US 2025/0362899 A1      Nov. 27, 2025

(51) Int. Cl.
| | |
|---|---|
| *G06F 9/44* | (2018.01) |
| *G06F 8/61* | (2018.01) |
| *G06F 8/658* | (2018.01) |

(52) U.S. Cl.
CPC ............... *G06F 8/658* (2018.02); *G06F 8/63* (2013.01)

(58) Field of Classification Search
CPC ................................... G06F 8/658; G06F 8/63
See application file for complete search history.

(56) References Cited

U.S. PATENT DOCUMENTS

| | | | |
|---|---|---|---|
| 10,824,489 B2 | 11/2020 | Caldato et al. | |
| 10,990,286 B1 | 4/2021 | Srinivasan et al. | |
| 11,635,908 B2 * | 4/2023 | Switzer | G06F 16/1844 |
| | | | 707/756 |
| 2010/0095289 A1 | 4/2010 | Nguyen et al. | |
| 2016/0085543 A1 | 3/2016 | Islam et al. | |
| 2018/0088926 A1 | 3/2018 | Abrams | |

(Continued)

OTHER PUBLICATIONS

International Searching Authority, "Notification of Transmittal of the International Search Report and the Written Opinion of the International Searching Authority, or Declaration," Patent Cooperation Treaty, Jun. 30, 2025, 16 pages, International Application No. PCT/EP2025/062597.

(Continued)

*Primary Examiner* — Qamrun Nahar
(74) *Attorney, Agent, or Firm* — CANTOR COLBURN LLP; Aaron Pontikos

(57) ABSTRACT

Automatic redeploying/upgrade of containers on multiple nodes using an Automated Deployment Software (ADS) having an Automated Deployment Tool (ADT) includes updating the ADS with a planned patch of a target layer, introducing a patchname sync command into the ADT to introduce a required patch type/specific patch and redeploy the containers, updating the ADT with a Producer Module (PM) and a Consumer Module (CM), running the ADT to cause the PM to update an image manifest item attribute, and push the image manifest item/new layer to a repository and running the ADT to cause the CM to read the image manifest item, identify and pull the unimpacted layers, and performing at least one of deploying/upgrading an application, or waiting for an available patch fix and deploying/upgrading the application.

20 Claims, 9 Drawing Sheets

(56) References Cited

U.S. PATENT DOCUMENTS

| | | |
|---|---|---|
| 2018/0367592 A1 | 12/2018 | Thomas et al. |
| 2019/0347121 A1 | 11/2019 | Luo et al. |
| 2020/0082094 A1 | 3/2020 | Mcallister et al. |
| 2020/0097662 A1 | 3/2020 | Hufsmith et al. |
| 2023/0025529 A1* | 1/2023 | Fu ............................ G06F 8/63 |
| 2023/0058477 A1* | 2/2023 | Jiang ........................ G06F 8/65 |

OTHER PUBLICATIONS

Anonymous, "A Method of Rolling Upgrade for Different Layers in a Container Orchestration System", IPCOM000260831D, IP.com, Dec. 26, 2019, 4 pages.
Anonymous, "Performing automated in-place cluster upgrades", URL: https://access.redhat.com/documentation/en-us/openshift_container_platform/3.11/html/upgrading_clusters/install-config-upgrading-automated-upgrades, (Retrieved: Feb. 23, 2024), 35 pages.
Anonymous, "System and Method for Adapting the Deployment ConfigurationAcross Cloud Vendors in Response to Automatic Upgrades ofContainerizedApplication", IPCOM000270358D, IP.com, Jul. 1, 2022, 5 pages.
List of IBM Patents or Patent Applications Treated as Related; (Appendix P); Date Filed: May 23, 2024, 2 pages.
Yue et al., "Computer Multi-Application Deployment", U.S. Appl. No. 18/332,219, filed Jun. 9, 2023.
Zhu et al., "System and Method for Automatically Redeploying Containers On Multiple Nodes in an Information Technology Infrastructure Based On Patches", U.S. Appl. No. 18/585,475, filed Feb. 23, 2024.

\* cited by examiner

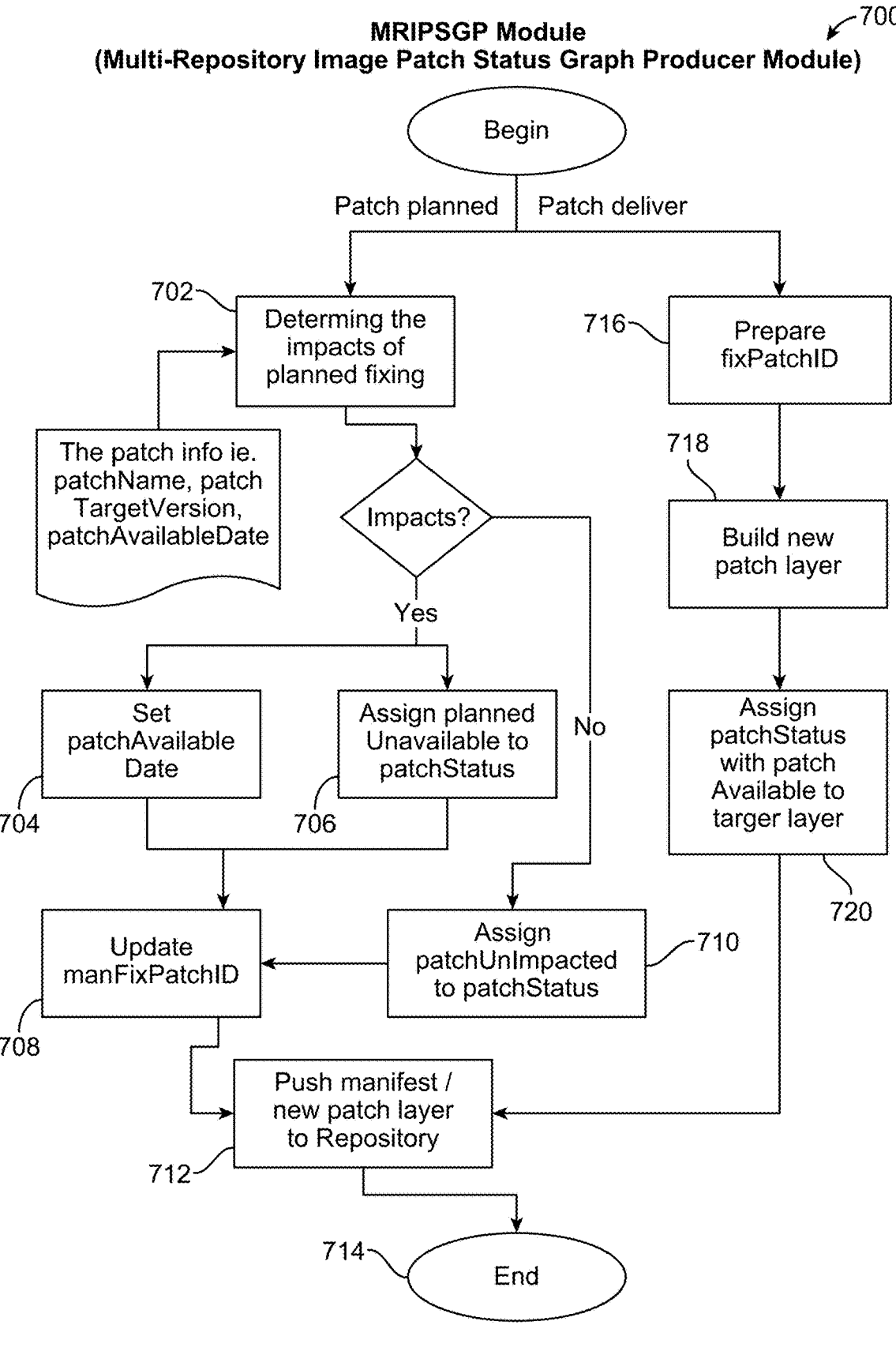

MRIPSGP Module
(Multi-Repository Image Patch Status Graph Producer Module)

700

Begin

Patch planned | Patch deliver

702 — Determing the impacts of planned fixing

The patch info ie. patchName, patch TargetVersion, patchAvailableDate

716 — Prepare fixPatchID

Impacts?

718

Build new patch layer

Yes

Set patchAvailable Date

704

Assign planned Unavailable to patchStatus

706

No

Assign patchStatus with patch Available to targer layer

720

Update manFixPatchID

708

Assign patchUnImpacted to patchStatus

710

Push manifest / new patch layer to Repository

712

714 — End

FIG. 4

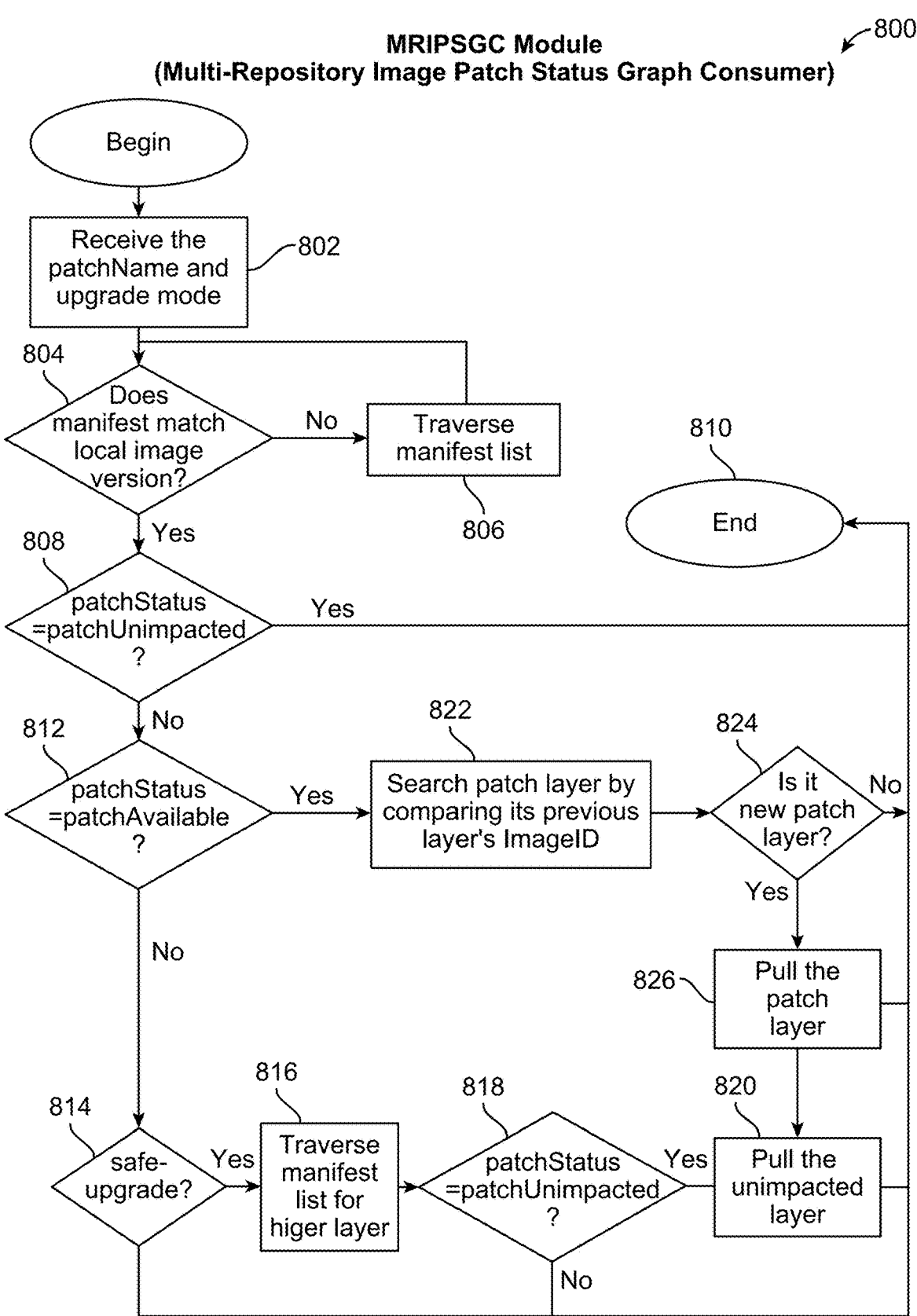

MRIPSGC Module
(Multi-Repository Image Patch Status Graph Consumer)

800

Begin

Receive the patchName and upgrade mode ——802

804

Does manifest match local image version? — No → Traverse manifest list

806

Yes

810

End

808 patchStatus =patchUnimpacted ? — Yes →

No

812 patchStatus =patchAvailable ? — Yes → Search patch layer by comparing its previous layer's ImageID — 822

824

Is it new patch layer? — No →

Yes

826 — Pull the patch layer

No

814 safe-upgrade? — Yes → Traverse manifest list for higer layer — 816

818 patchStatus =patchUnimpacted ? — Yes → Pull the unimpacted layer — 820

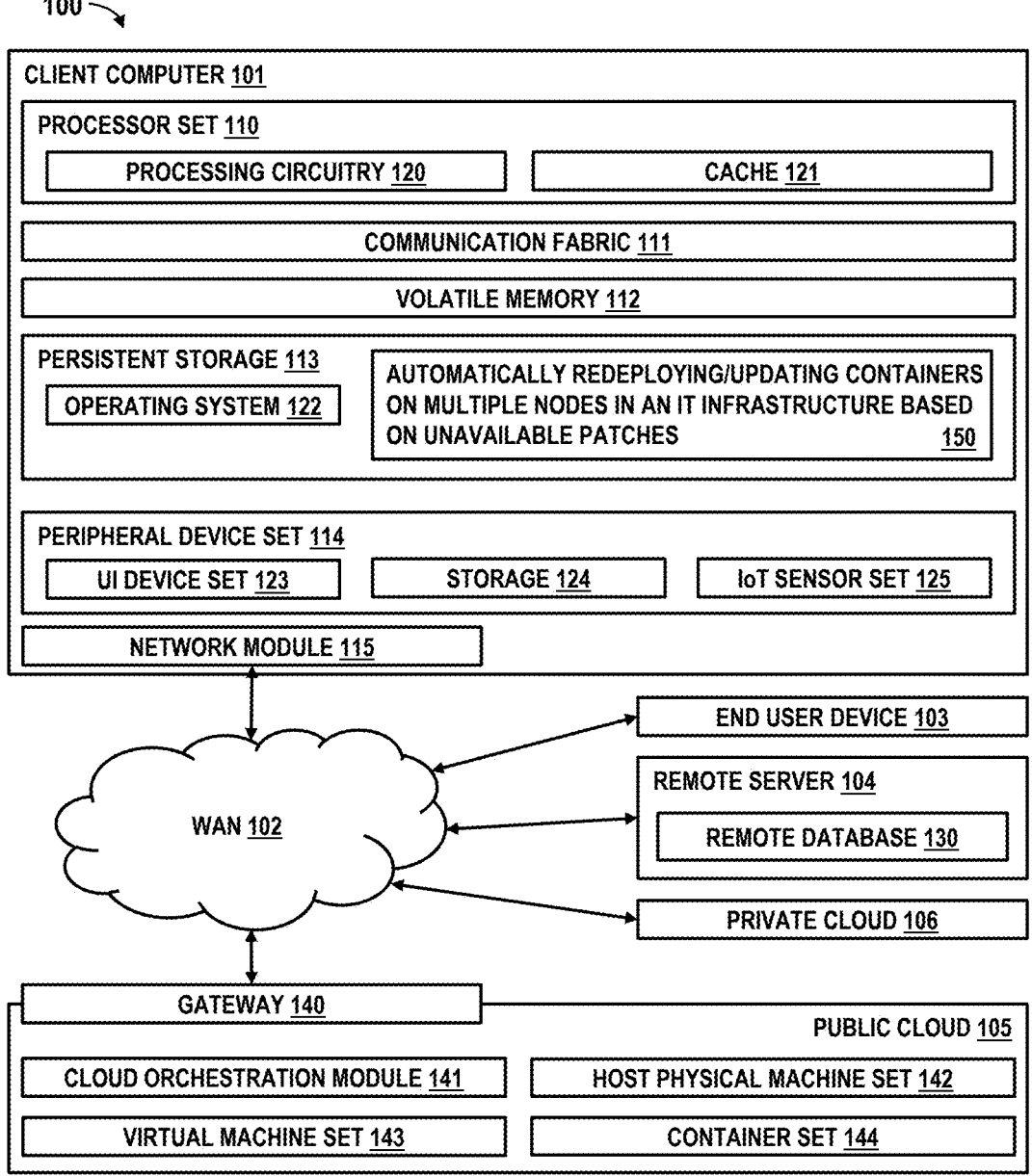

CLIENT COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

AUTOMATICALLY REDEPLOYING/UPDATING CONTAINERS ON MULTIPLE NODES IN AN IT INFRASTRUCTURE BASED ON UNAVAILABLE PATCHES          150

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

FIG. 6

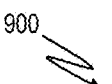

900

Installing a patchStatusattribute and a patchAvailableDateattribute in the Automation software application        902

↓

Installing a Patch:patchname, Sync mode command argument in the Automation software application        904

↓

Installing a Multi-Repository Image Patch Status Graph Producer (MRIPSGP) module into the automation software's automation engine        906

↓

Installing a Multi-Repository Image Patch Status Graph Consumer (MRIPSGC) module into automation software Graph Driver        908

↓

Running the automated deployment software configuration and development tool to update the manFixPackID into the manifest item and to push the manifest and the new patch layers to the repository        910

↓

Performing at least one of automatically implementing on-demand deployment and upgrade or waiting for an available patch fix        912

*FIG. 7*

AUTOMATIC REDEPLOYING/UPGRADING OF CONTAINERS ON MULTIPLE NODES IN AN INFORMATION TECHNOLOGY INFRASTRUCTURE BASED ON UNAVAILABLE PATCHES

BACKGROUND

The present invention generally relates to redeploying/upgrading containers in an Information Technology (IT) infrastructure, and more particularly to a system and method for automatically redeploying/upgrading containers on multiple nodes in an IT infrastructure based on planned patch information.

Ansible is a popular, simple and well-adopted automation language that describes the IT application infrastructure. It automates manual deployment logic, simplifies the deployment process, and improves deployment efficiency. Containers are packages of software that contain all of the necessary elements and information to run in any IT environment and they allow developers to isolate and run multiple applications on a single operating system instead of dedicating a virtual machine to each application on a server. Because Ansible and/or similar tools are typically used to deploy multiple services on multiple nodes, special attention must be paid to patch availability and possible security errors that may arise due to Common Vulnerabilities and Exposures (CVE).

Typically, upgrading applications involves simultaneously upgrading a batch of applications, so version compatibility control for multiple interdependent applications on multiple nodes is both important and difficult. In some situations, service providers need to continuously deliver various patches to multiple versions in the service loop simultaneously, where these patches include new features, Common Vulnerabilities and Exposure (CVE)-related patches, normal error fixes, etc. This continuous delivery is especially important for CVE patches due to security maintenance of specific versions of products and for reducing the workload of production exploitation.

SUMMARY

A method for automatically redeploying containers on multiple nodes using an automated deployment software having an automated deployment tool based on unavailable patches, the method including updating the automated deployment software with a planned patch of a target layer, introducing a patchname sync command into the automated deployment tool, wherein the patchname sync command introduces a required patch type or a specific patch to containers disposed on multiple nodes and invokes redeployment of the containers and updating the automated deployment tool with a producer module and a consumer module. The method further includes running the automated deployment tool to cause the producer module to update an image manifest item attribute in an image manifest item, and to push the image manifest item and a new layer to a repository. The method also includes running the automated deployment tool to cause the consumer module to read the image manifest item having an installed image, identify unimpacted layers, pull the unimpacted layers, and perform at least one of automatically implement on-demand deployment and upgrade of an application on at least one of the multiple nodes based on a user's patch sync mode, or wait for an available patch fix, wherein waiting includes parsing a Multi-Repository Image Patch Status Graph until the available patch fix is identified and, upon identifying the available patch fix, automatically implementing on-demand deployment and upgrade of the application on at least one of the multiple nodes based on the user's patch sync mode.

Embodiments of the invention are also directed to computer-implemented methods and computer program products having substantially the same features and functionality as the computer system described above.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 shows a block diagram illustrating the operational flow of a Multi-Repository Image Patch Status Graph Producer (MRIPSGP) Module, in accordance with an embodiment of the invention;

FIG. 5 shows a block diagram illustrating the operational flow of a Multi-Repository Image Patch Status Graph Consumer (MRIPSGC) Module, in accordance with an embodiment of the invention;

FIG. 6 shows a block diagram of an example computer system for use in accordance with one or more embodiments of the invention; and FIG. 7 shows a block diagram illustrating a method for automatically redeploying/updating containers on multiple nodes in an IT infrastructure based on unavailable patches, in accordance with an embodiment of the invention.

DETAILED DESCRIPTION

Figures 1A, 1B:
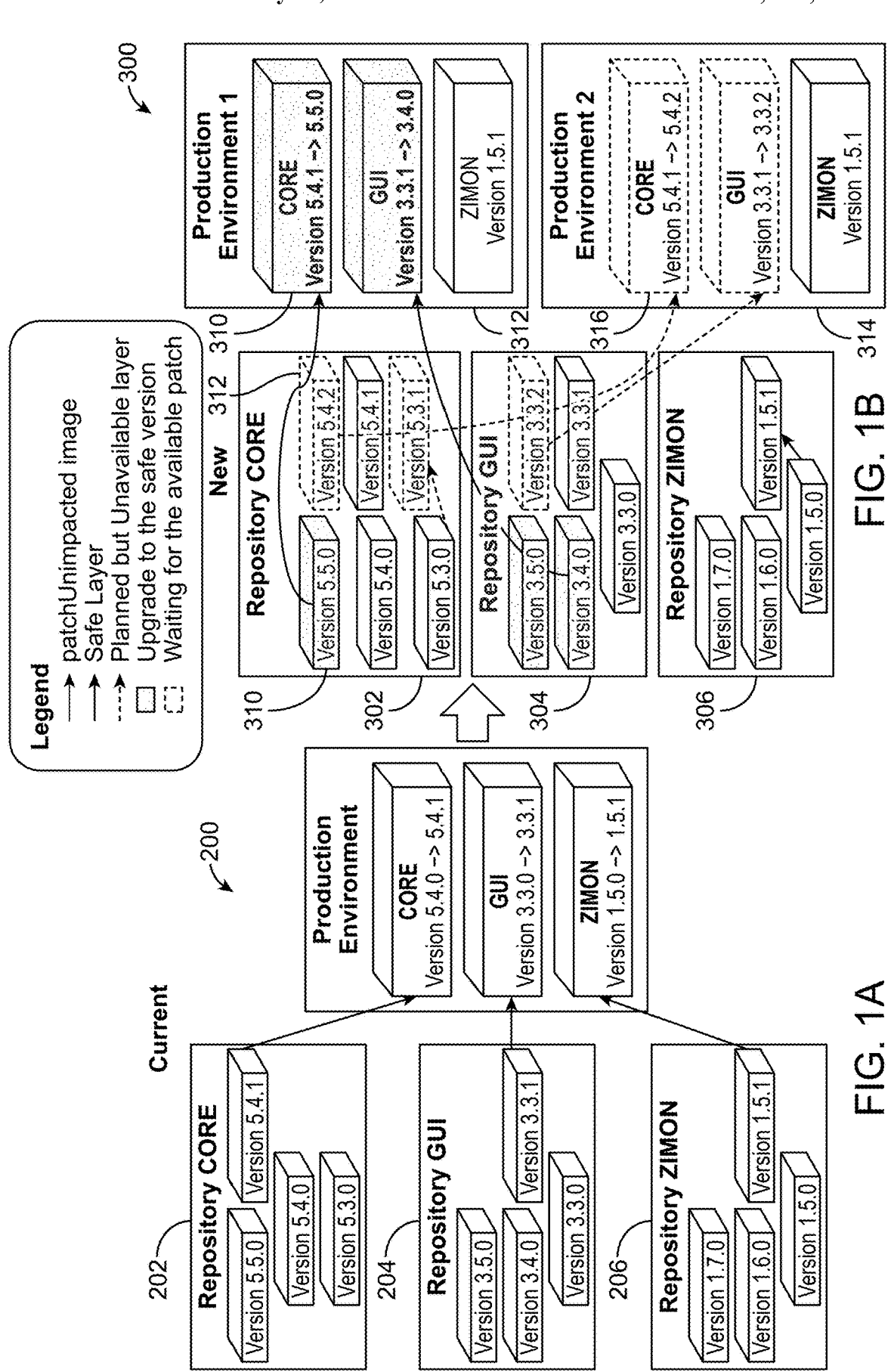
FIG. 1A shows a block diagram illustrating a configuration of a Repository CORE, Repository Graphical User Interface (GUI) and a Repository ZIMON (i.e., collector) of an application, in accordance with the prior art.
FIG. 1B shows a block diagram illustrating a Repository CORE 302 a Repository Graphical User Interface (GUI) and a Repository ZIMON (i.e., collector) of an application, in accordance with an embodiment of the invention.

As discussed briefly above, Ansible is a popular, simple and well-adopted automation software that describes the IT application infrastructure. It allows for the automation of manual deployment logic, simplification of the deployment process, and improvement in deployment efficiency. Because Ansible and/or similar automation tools are typically used to deploy multiple services on multiple nodes, special attention must be paid to patch availability and possible security errors that may arise due to Common Vulnerabilities and Exposures (CVE). Usually, it takes service providers several months, or longer, to fix the CVE or other security errors. Accordingly, having information about patch availability timeframes and which versions will be impacted would allow users to have a better use of product capabilities, automation and real time resiliency metrics. Unfortunately, however, information regarding patch availability/patch available date or unimpacted versions for the planned but unavailable patches is still unavailable to the user. And for the users at the enterprise level, it becomes an increasingly huge effort to assess the impacts on their complicated production environment and to avoid the security vulnerability exposure as little as possible. Moreover, this problem becomes particularly prominent in large-scale projects.

In an embodiment, the invention provides a method to ensure a better use of product capabilities, automation, and resiliency insights by updating, in advance, the manifest list of images in the repository with the planned, but unavailable patch information (e.g., patchName, patchStatus, patchAvailableDate, etc.). This would help users promote the robustness of the enterprise-level production environments as soon as possible and reduce/avoid any security vulnerability exposures to as little as possible. Generally, the method includes introducing a new module (Multi-Repository Image Patch Status Graph Producer (MRIPSGP)) and two new attributes ("patchStatus" and "patchAvailableDate") to the image manifest's config file, where the MRIPSGP module updates the manifest's config attribute manFixPackID with the patch name, patchStatus, and patchAvailableDate and then 'pushes' the updated manifest item into the manifest file by generating a Multi-Repository Image Patch Status Graph for all target layers and unimpacted layers.

The method further includes introducing another new module (Multi-Repository Image Patch Status Graph Consumer (MRIPSGC)) which is configured to detect the patch sync monde to either 'pull' the unimpacted layer for safe mode or wait for the availability of the patch's fixes by parsing the Multi-Repository Image Patch Status Graph. The MRIPSGC is further configured to automatically implement an on-demand deployment and upgrade of multiple applications on the multi-nodes based on the user's patch sync mode. This approach allows a user to specify the patch sync mode with more flexibility and efficiency during the upgrading process in large projects and is transparent to both the developer and the user.

In an embodiment, a method for automatically redeploying/upgrading containers on multiple nodes in an Information Technology (IT) infrastructure is provided, where the method provides an intelligent and automatic way to ensure the better use of product capabilities, automation and resiliency insights by updating, in advance, the manifest list of the image repository with the planned but unavailable patches information to help users to promote the robustness of the enterprise-level production environments in a timely fashion and to reduce exposure to security vulnerabilities.

As discussed briefly hereinabove, the method includes introducing the MRIPSGP module and the attributes patchStatus and patchAvailableDate to the image manifest item's attribute manFixPackId in the manifest's config file. The patchStatus is a planned patch of the target layer and includes the patchPlannedUnavailable, patchAvailable and patchUnimpacted attributes, where the patchAvailableDate attribute is the patch containing information about available dates of planned, but unavailable fixes. Additionally, a new command argument "Patch: patchName, Sync mode" is introduced into the ansible-playbook to invoke redeployment of the containers on the multiple nodes with the required patch type or with a specific patch e.g., CVE number by mode "safe-upgrade" or "wait-patch". The MRIPSGP module is introduced into the graph driver to update the manifest's config attribute manFixPackID with the patch name, patchStatus, and patchAvailableDate and then 'pushes' the updated manifest item into the manifest file and generates a Multi-Repository Image Patch Status Graph for all target layers and unimpacted layers.

The method further includes introducing the MRIPSGC module into the Ansible automation software (or other automation software and/or cloud exploitation or management tool) to read the manifest item with the installed image. The MRIPSGC then detects the patch sync mode to either 'pull' the unimpacted layer for safe mode or wait for the availability of the patch's fixes by parsing the Multi-Repository Image Patch Status Graph. The MRIPSGC is further configured to automatically implement an on-demand deployment and upgrade of multiple applications on the multi-nodes based on the user's patch sync mode.

It should be appreciated that an embodiment of a method for automatically redeploying/upgrading containers on multiple nodes in an Information Technology (IT) infrastructure is provided and is described as being used with IT automation software, such as the Ansible IT automation software, which includes the Ansible Playbook configuration and deployment tool. It should be appreciated that although the invention is discussed herein with regards to the Ansible IT automation software, the invention is compatible, and thus implementable, with other automated deployment software, such as Chef, SaltStack, etc. Moreover, as other automated deployment software provide software tools (i.e., "Chef's Cookbook" "Salt's States", etc.) which operate similarly in concept to the Ansible Playbook tool, the invention may be implemented with other automated deployment software by introducing a "Sync patch" command into the automated deployment software's configuration and deployment tool ("Chef's Cookbook" "Salt's States", etc.).

Referring to FIG. 1A, a block diagram 200 illustrating one scenario where the current configuration of a Repository CORE 202, Repository Graphical User Interface (GUI) 204 and a Repository ZIMON (i.e., collector) 206 of an application (such as Ansible) is illustrated, wherein each include multiple versions of patches. Not only does the current configuration require a user operation to identify and implement the most up to date patch, but it also requires information about the availability of the patch and the patches fixes. If the information about the availability of the patch and patch fixes are unavailable, then older versions must be used. However, referring to FIG. 1B, a block diagram 300 illustrating an embodiment of the method of the invention is implemented and also includes a Repository CORE 302, a Repository Graphical User Interface (GUI) 304 and a Repository ZIMON (i.e., collector) 306 of an application (such as Ansible) is illustrated, wherein each include multiple versions of patches. However, according to an embodiment, the latest version of safe patches 310 are automatically identified and the patches are automatically upgraded to a first product environment 312 as safe versions, while a second product environment 314 is waiting for the planned patches 316 to become available for installation.

Figure 2A:
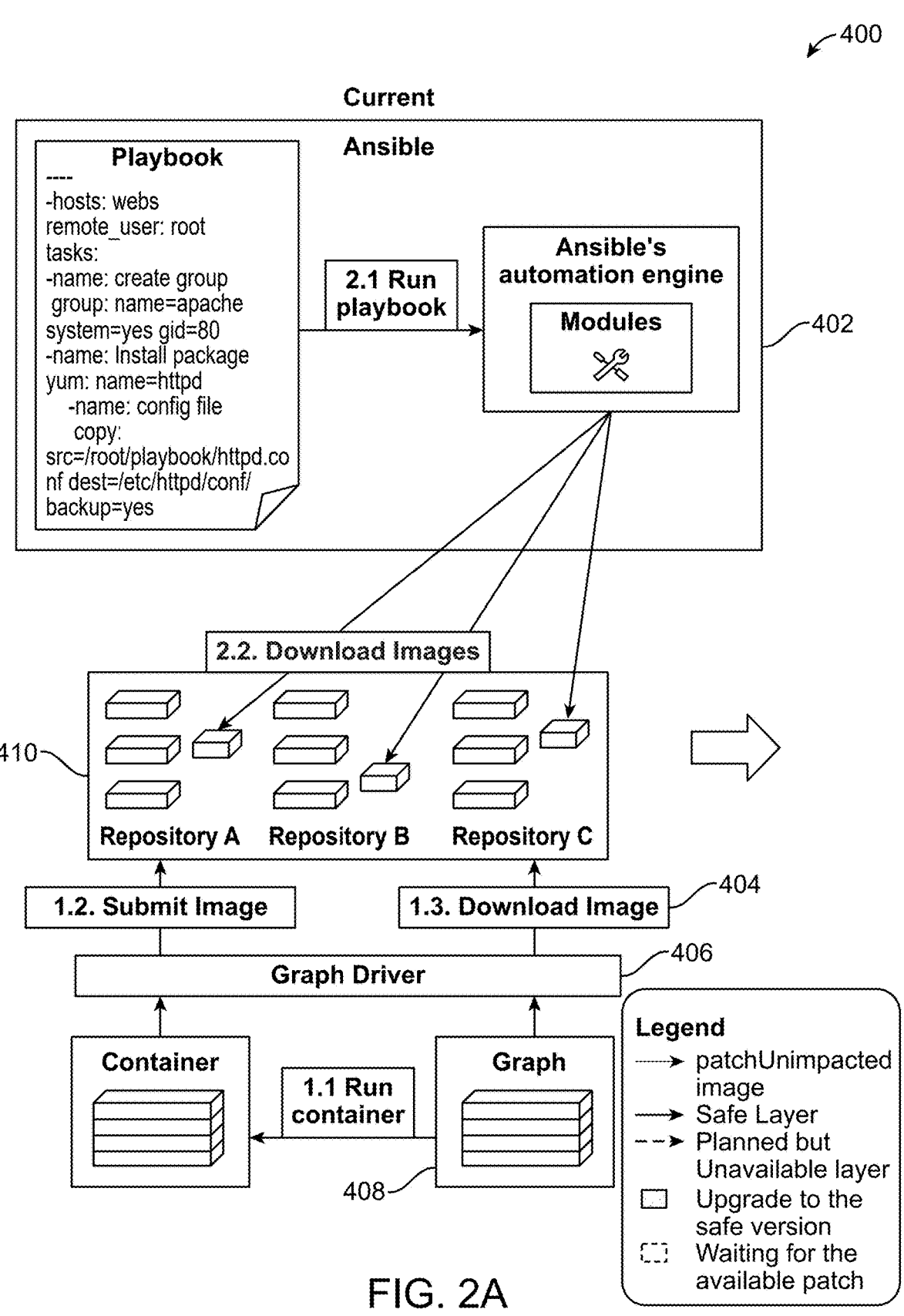
FIG. 2A shows a block diagram illustrating a method for implementing redeployment/upgrade of containers in a production environment, in accordance with the prior art.

Referring to FIG. 2A, the current method 400 for implementing redeployment/upgrade of containers is shown and includes running the Ansible playbook 402 to cause the Ansible automation software to download the patches (images) 404 to the graph driver 406. The graph driver 406 generates an image graph 408 and runs the container which submits the images to the repositories 410.

Figure 2B:
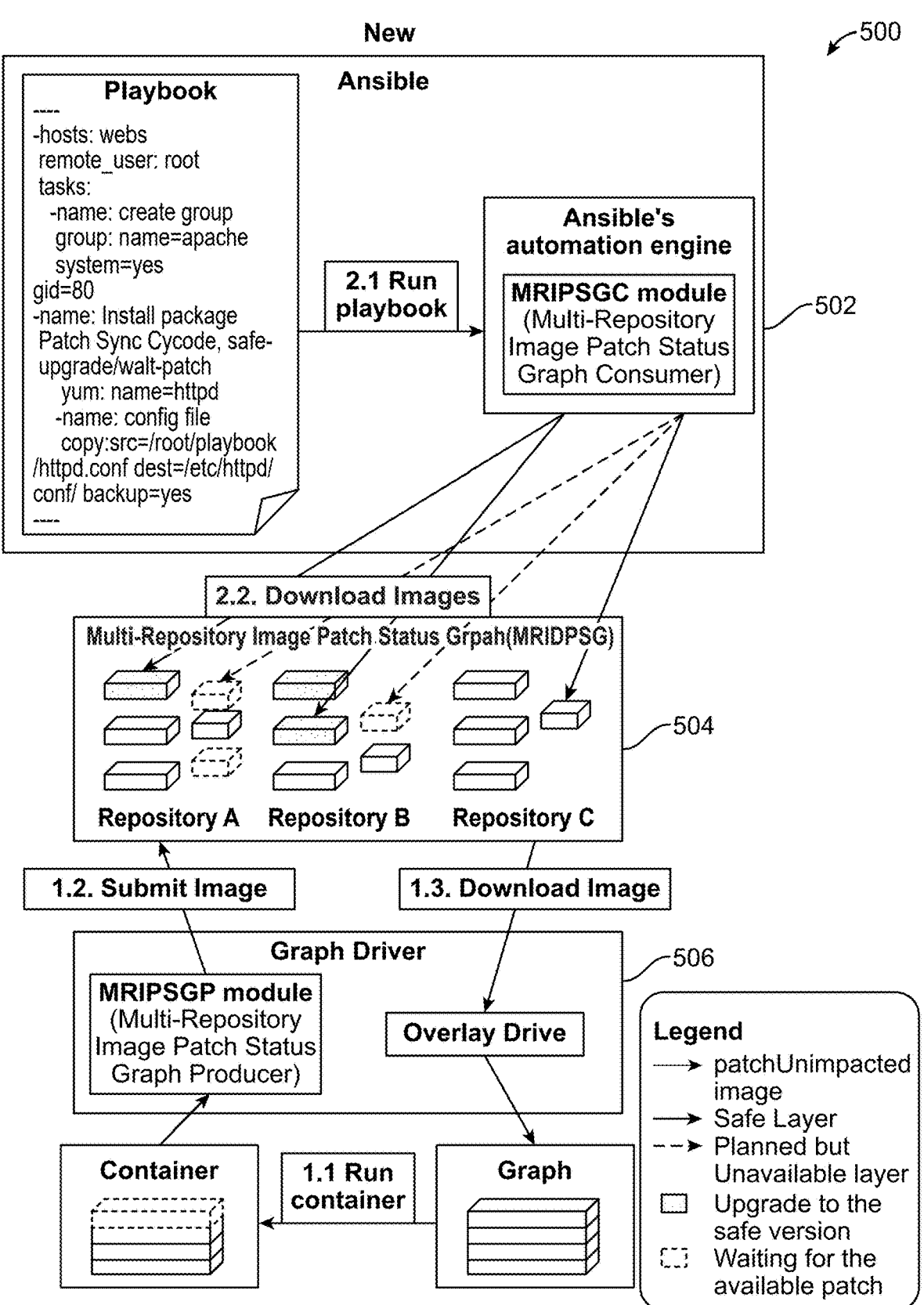
FIG. 2B shows a block diagram illustrating a method for implementing redeployment/upgrade of containers in a production environment, in accordance with an embodiment of the invention.

Referring to FIG. 2B, an embodiment of a method 500 of the invention for implementing redeployment/upgrade of containers is shown and includes running the software's configuration and deployment tool 502 (i.e., Ansible Playbook) to update the manFixPackID attribute of the target layers manifest and the patchUnimpacted layer manifest with the new attributes patchStatus and/or patchAvailableDate. This may be accomplished via the software's configuration and deployment tool which includes the MRIPSGP module, where the MRIPSGP module is responsible for updating the manifest config file, generating a Multi-Repository Image Patch Status Graph and pushing the manifest config file and the new patch layer to the repository 504 having the Multi-Repository Image Patch Status Graph. Image layers with the specified patchName are then identified via the graph driver 506, wherein the graph driver 506 includes the MRIPSGC module which is responsible for parsing the manifest config file and pulling the layer with the patch sync mode specified by the user. Moreover, the MRIPSGC is also responsible for parsing the Multi-Repository Image Patch Status Graph to detect the availability of patches. The graph driver 506, which includes the MRIPSGC module, pulls the safer layer by selecting the layer whose patchStatus is patchUnimpacted. The patchStatus of the layer is then set as patchAvailable and the manFixPackID attribute of the target layer manifest is updated by the graph driver 5006 that includes the MRIPSGP module. The graph driver 506 that includes the Image Specific Patch Relation Direct Graph Consumer module then automatically downloads the available patch layer for the wait-patch mode. It should be appreciated that the manFixPatchID is only stored in the manifest item and is not updated in the metadata of the image layer as a FixPatchID.

Figure 3A:
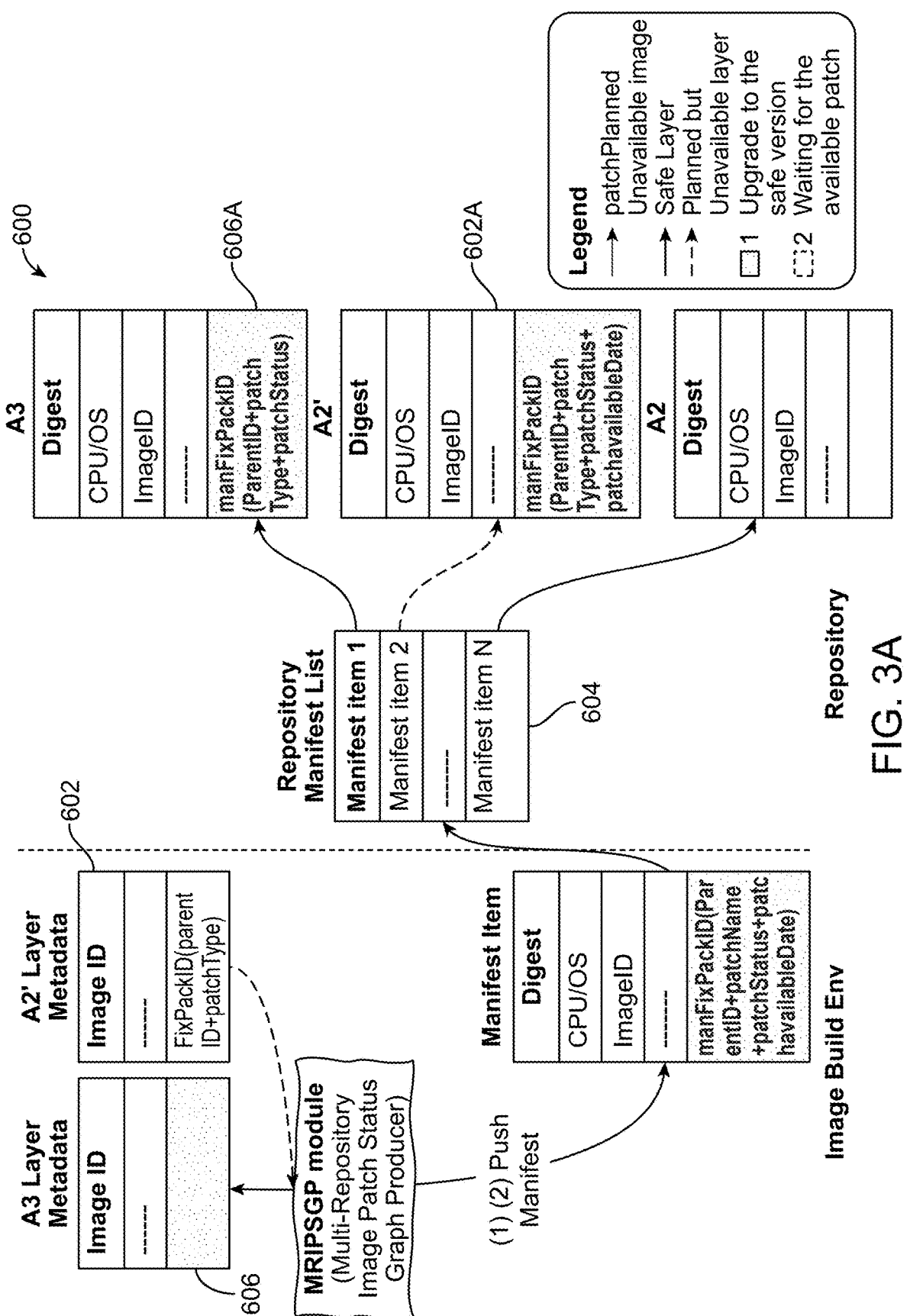
FIG. 3A shows a block diagram illustrating a method for adding patch attributes to the manifest of an application, in accordance with an embodiment of the invention.
Figure 3B:
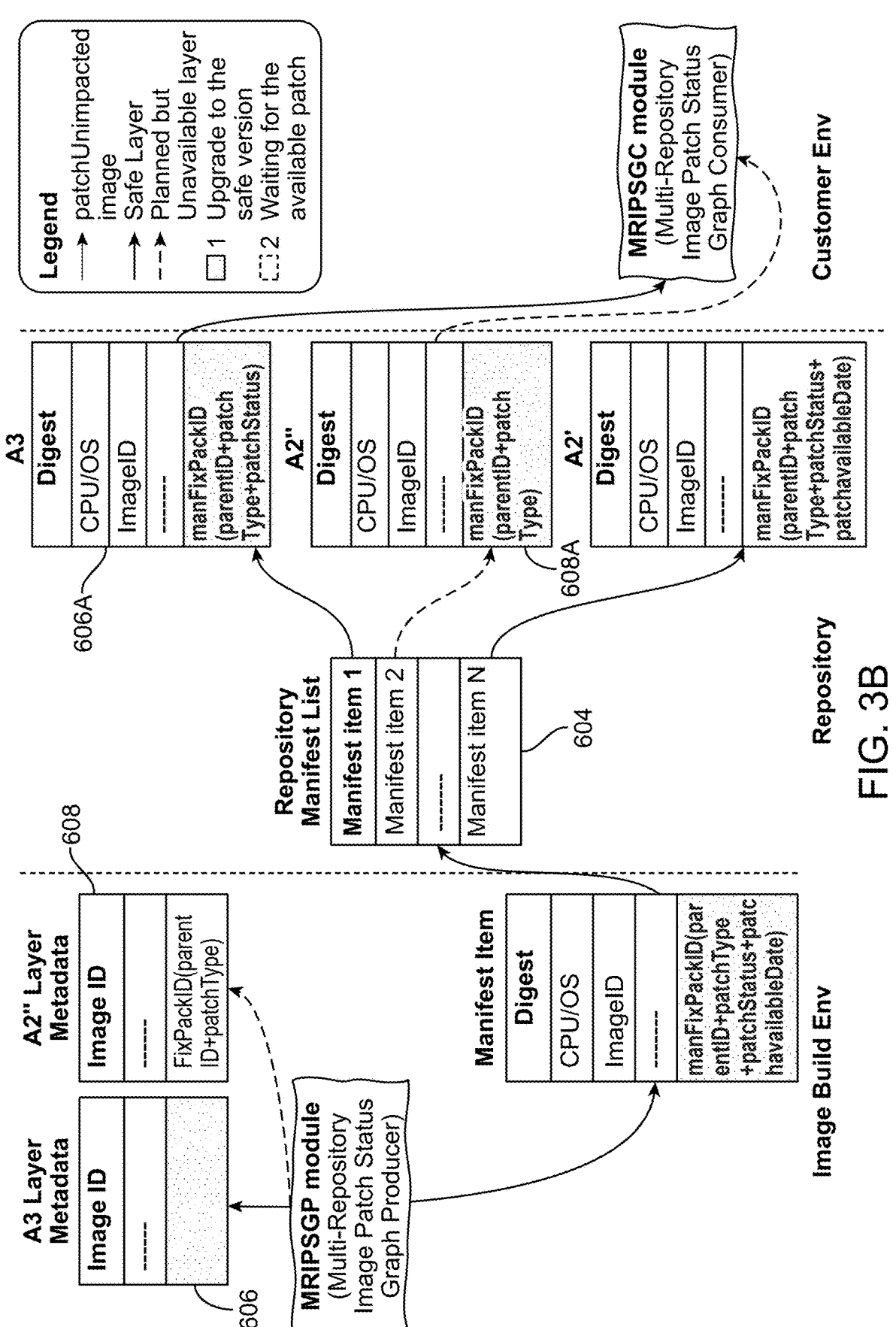
FIG. 3B shows a block diagram illustrating a method for adding patch attributes to the manifest of an application and automatically implementing on-demand deployment based on a user's patch sync mode, in accordance with an embodiment of the invention.

Referring to FIG. 3A and FIG. 3B, a block diagram illustrating a method 600 for adding the patchStatus attributes to the manifest is shown, according to an embodiment. Consider the situation where a patch to fix an issue (i.e., named CVE-2021-44228) is provided and delivered to the A2' layer 602. The MRIPSGP module updates the manFixPackID in the manifest item with the patchName (i.e., CVE-2021-44228), the patchStatus (i.e., patchPlannedUnavailable) and the patchAvailableDate (i.e., Dec. 30, 2023). The MRIPSGP then pushes the updated manifest of A2' 602 to the repository 604. Because the issue (i.e., CVE-2021-44228) does not impact A3 606, the MRIPSGP module updates the manFixPackID with the patchName (i.e., CVE-2021-44228), the patchStatus (i.e., patchPlannedUnavailable) and the patchAvailableDate (i.e., Dec. 30, 2023) in the manifest item of A3 606 and pushes the updated manifest of A3 606 to the repository 604. The MRIPSGC module then traverses the patchName (i.e., CVE-2021-44228) in the manifest list and finds the corresponding manFixPackID for A2' 602 whose patchName is CVE-2021-44228, where the patchStatus is set as patchPlannedUnavailable and the patchAvailableDate is set as Dec. 30, 2023. The MRIPSGC continues to traverse the manifest list and gets the patchStatus of A3 606 which is set to patchUnimpacted.

If the user's upgrade setting is set to "Safe-upgrade", then the MRIPSGC module selects A3 606 and pulls A3 606. Else, the MRIPSGC module doesn't do anything until the A2" 608 is available as the patchAvailableDate stated in the manifest of A2' 602. The MRIPSGP module then builds a new layer A2" 608 for the issue fixes (i.e., CVE-2021-44228), and updates the manifest item of A2' 602 with manFixPackID and sets the patchStatus as patchAvailable. The MRIPSGC then pushes the new patch layer (A2") 608, the new patch layer's manifest 608A and the target layer's manifest (A2') 602A to the repository 604. The MRIPSGC traverses the patchName (i.e., CVE-2021-44228) in the manifest list, finds the manFixPackID (A2") whose patchName is CVE-2021-44228 and the patchName of the Fix-PackID in the layer metadata that matches CVE-2021-44228 and pulls A2" 608 which is the available fix for patchName CVE-2021-44228.

Referring to FIG. 4, a block diagram illustrating a method 700 for implementing the Multi-Repository Image Patch Status Graph Producer (MRIPSGP) module is shown, according to an embodiment. For planned patches to fix an issue, the MRIPSGP module will examine the patch and according to the information of the introduced patch (i.e., patchName, patch Target Version, patch AvailableDate), the MRIPSGP module will determine the impact of planned fix 702. If the issue has an impact, then the MRIPSGP module will set the patchAvailableDate 704, assign the patchPlannedUnavailable to the patchStatus 706 and update the manFixPatchID with all of the attributes (e.g., patchName, patchStatus, patchAvailableDate, etc.) 708. If the issue does not have an impact, then the MRIPSGP module will assign the patchPlannedUnavailable to the patchStatus and update the manFixPatchID with all of the attributes (e.g., patchName, patchStatus, patchAvailableDate, etc.) 710. The MRIPSGP module will then push the updated manifest to the repository 712 and terminate operation 714. On the other hand, for patches that are delivered, the MRIPSGP module will prepare the fixPatchID for the new patch layer 716, when the patch becomes available. The MRIPSGP module will then build the new patch layer 718 and assign the patchAvailable attributes to the patchStatus attributes for the target layers (i.e., the new target layer and the target layer) 720. The MRIPSGP module will then push the updated manifest, the new patch layer and the new patch layers manifest to the repository 712 and terminate operation 714.

Referring to FIG. 5, a block diagram illustrating a method 800 for implementing the MRIPSGC module is shown, according to an embodiment. When the patch is introduced, the MRIPSGC module receives the patchName (i.e., CVE-2021-44228) and upgrades the mode 802. The MRIPSGC module then traverses the manifest list of the repository to determine if the manifest matches the local image version 804, where if the manifest of the repository does not match the local image version, then the MRIPSGC module traverses the manifest list to get a 'next' manifest item 806 and then determine if the next manifest item matches the local image version 804. This is repeated until a manifest item matches the local image version. If the patchStatus matches the local image version, then the MRIPSGC module determines whether the patchStatus attribute is the same as the patchUnimpacted attribute 808. If the patchStatus attribute is the same as with the patchUnimpacted attribute, then the MRIPSGC terminates operation 810. If the patchStatus attribute is not the same as with the patchUnimpacted attribute, then the MRIPSGC determines if the patchStatus attribute is not the same as the patchAvailable attribute 812.

If the patchStatus attribute is not the same as the patchAvailable attribute, then the MRIPSGC module determines if the upgrade is safe 814. If the upgrade is not safe, then the MRIPSGC module ends operation 810. If the upgrade is safe, then the MRIPSGC module traverses the manifest list of the repository for a higher layer 816 and determines if the patchStatus attribute is the same as with the patchUnimpacted attribute 818. If the patchStatus attribute is not the same as with the patchUnimpacted attribute, then the MRIPSGC module ends its operation 810. If the patch-Status attribute is the same as with the patchUnimpacted attribute, then the MRIPSGC module pulls the unimpacted layer 820 and ends its operation 810. If the patchStatus attribute is the same as the patchAvailable attribute 812, then the MRIPSGC module searches the patch layer 822 by comparing its previous layer's imageID with the imageID of the target layer to determine if the patch layer is a new patch layer 824. If the patch layer is not a new patch layer, then the MRIPSGC module ends its operation 810. If the patch layer is a new patch layer, then the MRIPSGC module pulls the patch layer 826 and ends its operation 810.

It should be appreciated that the method of the invention makes it possible to allows users specifying the patch sync mode with more flexibility and efficiency during upgrading in large projects. It should be further appreciated that the invention makes it possible to download image layers with related patches in an on-demand fashion and automatically deploy and update the image layers with as little impact as possible on the enterprise user's production environments. The invention reduces unnecessary downloads of image layers by automatically obtaining dependency versions with wanted patches, which not only improves the efficiency of deployment, but also reduces the side effects of redeployment on the production environments. The invention also provides a method where both developers and users can easily maintain and upgrade the whole environment without the need for extra work related to patches issue that may occur on some image layer versions. 4. Moreover, the invention is compatible with and may be implemented with current container tools (i.e., Docker, Podman, etc.).

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as for automatically redeploying/updating containers on multiple nodes in an IT infrastructure based on unavailable patches 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 6. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

One or more embodiments described herein can utilize machine learning techniques to perform tasks. More specifically, one or more embodiments described herein can incorporate and utilize rule-based decision making and artificial intelligence (AI) reasoning to accomplish the various operations described herein, namely containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

In accordance with an embodiment, a method 900 for automatically redeploying/updating containers on multiple nodes in an IT infrastructure based on unavailable patches is provided, as shown in FIG. 7. The method 900 includes introducing and installing a patchStatus attribute and a patchAvailableDate attribute into the fix pack manFix- PackID, as shown in operational block 902. As discussed hereinabove, the patchStatus attribute is the planned patch of the target layer and includes the patchPlannedUnavailable attribute, the patchAvailable attribute and the patchUnimpacted attribute. The patchAvailableDate attribute is the patch available date of any planned, but unavailable fixes. The method 800 further includes introducing and installing a Patch: patchname, Sync mode command argument into the automation software engine (i.e., Ansible playbook), as shown in operational block 904. This Patch: patchname, Sync mode command argument is introduced as the new statement of the automation software engine to invoke the redeployment of containers on multiple nodes with the required patch type or with a specific patch (i.e., CVE number by mode "safe-upgrade" or "waiting-patch").

The method 800 further includes introducing and installing a Multi-Repository Image Patch Status Graph Producer (MRIPSGP) module into the graph driver of the automation software (e.g., Ansible's automation software), as shown in operational block 906. It should be appreciated that the MRIPSGP is introduced into the graph driver to update the manifest's config attribute manFixPackID with the patch name, patchStatus and patchAvailableDate information, and then push the updated manifest item into the manifest file. The MRIPSGP also generates a Multi-Repository Image Patch Status Graph for all target layers and all unimpacted layers. The method 800 further includes introducing and installing a Multi-Repository Image Patch Status Graph Consumer (MRIPSGC) module into the automation software engine (e.g., Ansible's playbook), as shown in operational block 908. It should be appreciated that the MRIPSGC is introduced into the automation softwares engine (i.e., Ansible's automation engine-Ansible Playbook or some other cloud exploitation or management tools) to read the manifest item with the installed image. The MRIPSGC then parses Multi-Repository Image Patch Status Graph to detect the patch sync mode to identify and pull the unimpacted layers for safe-mode or to wait for the availability of any patches with fixes. The MRIPSGC then automatically implements on-demand deployment and upgrade of multiple applications on the multi-nodes based on the user's patch sync mode.

The method 800 includes running the automated deployment software configuration and deployment tool (e.g., the Ansible Playbook), wherein the automated deployment software configuration and deployment tool operates the MRIPSGP to update the manFixPackID in the manifest item and push the manifest and the new patch layers to the repository, as shown in operational block 910. The method 800 further includes running the automated deployment software configuration and deployment tool (e.g., Ansible Playbook) operate the MRIPSGC to receive the patchName and upgrade mode and to determine if the patchStatus is unimpacted (patchUnimpacted), and if so the MRIPSGC terminates operation. If the patchStatus is impacted and available, then the MRIPSGC examines the patch layer to determine if patch layer is new. If the patch layer is not new, then the MRIPSGC terminates operation. If the patch layer is new, then the patch layer is pulled. If the patchStatus is impacted and unavailable, then the MRIPSGC determines if the patch is a safe-upgrade, where if the patch is not a safe-upgrade, the MRIPSGC terminates operation. If the patch is a safe-upgrade, then the MRIPSGC traverses the manifest list to determine if there are higher patch layers and if the patch layer is unimpacted. If the patch layer is unimpacted, then the unimpacted layer is pulled.

The method further includes at least one of automatically implementing on-demand deployment and upgrade of an application on at least one of the multiple nodes based on a user's patch sync mode, or waiting for an available patch fix, wherein waiting includes parsing a Multi-Repository Image Patch Status Graph until the available patch fix is identified and, upon identifying the available patch fix, automatically implementing on-demand deployment and upgrade of the application on at least one of the multiple nodes based on the user's patch sync mode, as shown in operational block 912.

It should be appreciated that although the method of the invention is described herein with regards to Ansible, the method of the invention may be used with any suitable configuration management, automation, and server orchestration software devOps software having an automated deployment software configuration and deployment tool.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein. Moreover, the embodiments or parts of the embodiments may be combined in whole or in part without departing from the scope of the invention.

What is claimed is:

1. A method for automatically redeploying containers on multiple nodes using an automated deployment software having an automated deployment tool based on unavailable patches, the method comprising:
   updating the automated deployment software with a planned patch of a target layer;
   introducing a patchname sync command into the automated deployment tool, wherein the patchname sync command introduces a required patch type or a specific patch to containers disposed on multiple nodes and invokes redeployment of the containers;
   updating the automated deployment tool with a producer module and a consumer module;
   running the automated deployment tool to cause the producer module to:
      update an image manifest item attribute in an image manifest item, and
      push the image manifest item and a new layer to a repository; and
   running the automated deployment tool to cause the consumer module to:
      read the image manifest item having an installed image,
      identify unimpacted layers,
      pull the unimpacted layers, and
      perform at least one of:
         automatically implement on-demand deployment and upgrade of an application on at least one of the multiple nodes based on a user's patch sync mode, or
         wait for an available patch fix, wherein waiting includes parsing a Multi-Repository Image Patch Status Graph until the available patch fix is identified and, upon identifying the available patch fix, automatically implementing on-demand deployment and upgrade of the application on at least one of the multiple nodes based on the user's patch sync mode.

2. The method of claim 1, wherein updating the automated deployment software with the planned patch of the target layer includes running the automated deployment tool to update the automated deployment software, wherein the planned patch includes patch availability information, patch impact information and patch date information regarding planned, unavailable fixes.

3. The method of claim 1, wherein the image manifest item attribute is updated with patch name information, patch status information, the patch availability information, the patch impact information and the patch date information regarding planned, unavailable fixes.

4. The method of claim 1, wherein updating the automated deployment tool includes running the automated deployment tool to update a graph driver of the automated deployment tool with the producer module.

5. The method of claim 1, wherein updating the automated deployment tool includes running the automated deployment tool to update the automated deployment tool with the consumer module.

6. The method of claim 1, wherein the producer module is configured to generate the Multi-Repository Image Patch Status Graph for target layers and the unimpacted layers.

7. The method of claim 6, wherein the read the image manifest item, the identify unimpacted layers and the pull the unimpacted layers includes parsing the Multi-Repository Image Patch Status Graph.

8. A computing system, comprising:
   a processor configured to perform operations for automatically redeploying containers on multiple nodes using an automated deployment software having an automated deployment tool based on unavailable patches, the operations comprising:
      updating the automated deployment software with a planned patch of a target layer;
      introducing a patchname sync command into the automated deployment tool, wherein the patchname sync command introduces a required patch type or a specific patch to containers disposed on multiple nodes and invokes redeployment of the containers;

updating the automated deployment tool with a producer module and a consumer module;

running the automated deployment tool to cause the producer module to:

update an image manifest item attribute in an image manifest, and push the image manifest item and a new layer to a repository; and running the automated deployment tool to cause the consumer module to:

read the image manifest item having an installed image, identify unimpacted layers, pull the unimpacted layers, and perform at least one of:

automatically implement on-demand deployment and upgrade of an application on at least one of the multiple nodes based on a user's patch sync mode, or wait for an available patch fix, wherein waiting includes parsing a Multi-Repository Image Patch Status Graph until the available patch fix is identified and, upon identifying the available patch fix, automatically implementing on-demand deployment and upgrade of the application on at least one of the multiple nodes based on the user's patch sync mode.

9. The computing system of claim 8, wherein updating the automated deployment software with the planned patch of the target layer includes running the automated deployment tool to update the automated deployment software, wherein the planned patch includes patch availability information, patch impact information and patch date information regarding planned, unavailable fixes.

10. The computing system of claim 8, wherein the image manifest item attribute is updated with patch name information, patch status information, the patch availability information, the patch impact information and the patch date information regarding planned, unavailable fixes.

11. The computing system of claim 8, wherein updating the automated deployment tool includes running the automated deployment tool to update a graph driver of the automated deployment tool with the producer module.

12. The computing system of claim 8, wherein updating the automated deployment tool includes running the automated deployment tool to update the automated deployment tool with the consumer module.

13. The computing system of claim 8, wherein the producer module is configured to generate the Multi-Repository Image Patch Status Graph for target layers and the unimpacted layers.

14. The computing system of claim 13, wherein the read the image manifest item, the identify unimpacted layers and the pull the unimpacted layers includes parsing the Multi-Repository Image Patch Status Graph.

15. A computer program product comprising a computer readable storage medium having program instructions embodied therewith, the program instructions executable by a processor to cause the processor to perform operations for automatically redeploying containers on multiple nodes using an automated deployment software having an automated deployment tool based on unavailable patches, the operations comprising:

updating the automated deployment software with a planned patch of a target layer;

introducing a patchname sync command into the automated deployment tool, wherein the patchname sync command introduces a required patch type or a specific patch to containers disposed on multiple nodes and invokes redeployment of the containers;

updating the automated deployment tool with a producer module and a consumer module;

running the automated deployment tool to cause the producer module to:

update an image manifest item attribute in an image manifest item, and push the image manifest item and a new layer to a repository; and running the automated deployment tool to cause the consumer module to:

read the image manifest item having an installed image, identify unimpacted layers, pull the unimpacted layers, and perform at least one of:

automatically implement on-demand deployment and upgrade of an application on at least one of the multiple nodes based on a user's patch sync mode, or wait for an available patch fix, wherein waiting includes parsing a Multi-Repository Image Patch Status Graph until the available patch fix is identified and, upon identifying the available patch fix, automatically implementing on-demand deployment and upgrade of the application on at least one of the multiple nodes based on the user's patch sync mode.

16. The computer program product of claim 15, wherein updating the automated deployment software with the planned patch of the target layer includes running the automated deployment tool to update the automated deployment software, wherein the planned patch includes patch availability information, patch impact information and patch date information regarding planned, unavailable fixes.

17. The computer program product of claim 15, wherein the image manifest item attribute is updated with patch name information, patch status information, the patch availability information, the patch impact information and the patch date information regarding planned, unavailable fixes.

18. The computer program product of claim 15, wherein updating the automated deployment tool includes running the automated deployment tool to update a graph driver of the automated deployment tool with the producer module.

19. The computer program product of claim 15, wherein updating the automated deployment tool includes running the automated deployment tool to update the automated deployment tool with the consumer module.

20. The computing system of claim 8, wherein the producer module is configured to generate the Multi-Repository Image Patch Status Graph for target layers and the unimpacted layers, and wherein the read the image manifest item, the identify unimpacted layers and the pull the unimpacted layers includes parsing the Multi-Repository Image Patch Status Graph.

\* \* \* \* \*